Reissued May 6, 1941 Re. 21,789

UNITED STATES PATENT OFFICE 21,789

ABRASIVE TOOL

Joseph Newell Bethel, Epp Haven, St. Minver, England, assignor to Norton Company, Worcester, Mass., a corporation of Massachusetts No Drawing. Original No. 1,931,370, dated October 17, 1933, Serial No. 316,881, November 2, 1928. Application for reissue July 20, 1940, Serial No. 346,662. In Great Britain November 29, 1927

16 Claims. (Cl. 51—300)

This invention relates to the grinding, lapping, polishing and finishing of metals and in particular it relates to the lapping of metal surfaces such as the interiors of engine cylinders, bearings, and other parts of machinery where a very accurate finish or fit is required and where the said parts of machinery are required to have relative motion with other parts or members when assembled and in use.

For convenience the invention will be described as applied to lapping, but it is to be understood that it may also be applied to tools or members used for grinding, polishing and general abrading purposes.

Apart from the usual composition of grinding wheels, sticks and bars of various kinds (where the powdered or granulated abrasive material is mixed with plastic or cementitious substances or materials) it is customary in the process of lapping and polishing the surfaces of metal parts to employ a powdered abrasive material with or without a liquid lubricant, and to apply the same to the surface of the lapping tool, and in some cases the powdered abrasive is rubbed into the surface of the lapping tool by suitable devices. With these methods it is found that particles of the abrasive material become embedded in the finished surface of the article after lapping, this being particularly the case in the lapping of soft metals or comparatively soft metals such as cast iron, brass, bronze, aluminum and so forth, and when the surfaces carrying the said particles are in use the presence of the latter produces an undesirable amount of friction and considerably reduces the effective life of the cylinders, bearings and so forth.

Better results can be obtained with the use of tools which (or the operating surfaces of which) consist of abrasive powder embedded in a metal, the abrasive powder being mixed with a metallic bond in powdered or other form and the mixture being moulded or cast to the required shape by a hot or cold process. The present invention relates to an improved method of forming such a surface, and to a tool formed in this manner, whereby the surfaces of metal parts may be lapped by the tool without the possibility of the particles of abrasive material becoming embedded in the said surfaces or where such possibility is reduced to a minimum.

To this end and according to the present invention, the lapping tools or surfaces thereof are made by mixing granulated or powdered metal or metals with a powdered or granulated abrasive material and with a suitable binding medium, such as shellac or sodium silicate, and the resulting composition is moulded, preferably under pressure, to the required shape, and baked to solidify or set the shellac or silicate bond, in accordance with the well known methods employed in this art. This type of bond is comparatively weak or brittle and is therefore capable of permitting the granular material on the surface to break away from time to time and fresh material to be presented for the lapping operation.

In making the improved lapping tool or member I may employ any suitable metal for carrying the abrasive material (as examples, I may employ brass, bronze, aluminum, tin, lead, or any suitable alloy or mixtures thereof); and any suitable powdered abrasive material may be incorporated with the metal (as example, I may employ silicon carbide, crystalline alumina, emery and kindred abrasives).

The improved lapping tools may be shaped in the form of bars, segments, discs, wheels, or any other suitable form according to the work to be done. The proportions of the metal and powdered or granular abradant will be determined by the work to which the lapping tool made therefrom is to be applied. Sufficient binding medium is used to enable the mixture to be worked up into a suitable plastic form. As an example, in a particular case I may use, say, 67% by weight of abrasive material, 28% by weight of powdered metal, and 5% by weight of binding medium. The amount of the latter will, of course, vary with the quantity and kind of metal used.

The improved lapping tools may be made of a suitable surface thickness prepared in the manner described and provided with a supporting core or backing of any suitable metal or material.

In accordance with the prior art, metal plates having their surfaces charged with abrasive grains have been used for lapping purposes, but the grains wear out or are removed from the plate by the lapping operation, thus necessitating frequent re-charging of the plate surface. It is believed that when the mixture of metal particles and abrasive grains are bonded in accordance with my invention and are molded under pressure, then put into use, a large portion of the abrasive grains are embedded within the metal particles, thus providing a uniformly charged metal lapping tool which may be used until the lap has worn down to a small size without requiring any further charging treatment. In other words, I have provided a self-renewing, ever sharp lap of metal charged with abrasive, and thus provide the desirable properties of the charged metal plates heretofore used in the art. Whether or not the abrasive grains are embedded in the metal particles, yet the close juxtaposition of the two serves to give the same type of lapping operation heretofore had with charged metal plates.

What I claim as my invention and desire to secure by Letters Patent is:

1. An abrasive tool comprising a molded, compacted mixture of separate and distinct particles of granular metal and granular abrasive material held in position by a brittle, non-metallic bond which has been heat set to form an integral body.

2. An abrasive tool comprising a molded, compacted body of separate and distinct particles of granular metal and granular abrasive material united by a small amount of a weak, non-metallic bond which has been heat set in position to form an integral body, said abrasive material forming the major portion of the body.

3. An abrasive tool comprising a molded, highly compressed mixture of separate and distinct metal particles and abrasive grains weakly bonded together by a relatively small amount of a non-metallic material intimately mixed therewith and heat set at a temperature below the melting point of the metal into a friable, but substantially unitary abrasive aggregate.

4. An abrasive tool comprising a molded, highly compressed mixture of separate and distinct metal particles and abrasive grains weakly bonded together into a friable body by a relatively small amount of a non-metallic material intimately mixed therewith and thereby forming a self-renewing charged metal lap.

5. An abrasive tool comprising a molded, compacted mixture of separate and distinct particles of granular metal and granular abrasive material held in position by a brittle, silicate bond which has been heat set to form an integral body.

6. An abrasive tool comprising a molded, compacted body of separate and distinct particles of granular metal and granular abrasive material united by a small amount of a weak, silicate bond which has been heat set in position to form an integral body, said abrasive material forming the major portion of the body.

7. An abrasive tool comprising a molded, highly compressed mixture of separate and distinct metal particles and abrasive grains weakly bonded together by a relatively small amount of a silicate material intimately mixed therewith and heat set at a temperature below the melting point of the metal into a friable, but substantially unitary abrasive aggregate.

8. An abrasive tool comprising a molded, highly compressed mixture of separate and distinct metal particles and abrasive grains weakly bonded together into a friable body by a relatively small amount of a silicate material intimately mixed therewith and thereby forming a self-renewing charged metal lap.

9. An abrasive tool comprising a molded, compacted mixture of separate and distinct particles of granular metal and granular abrasive material, there being at least approximately 40% as much metal as abrasive, held in position by a brittle, non-metallic bond which has been heat set to form an integral abrasive charged metal body.

10. An abrasive tool comprising a molded, highly compressed mixture of separate and distinct metal particles and abrasive grains, there being at least approximately 40% as much metal as abrasive, weakly bonded together by a relatively small amount of a non-metallic material intimately mixed therewith and heat set at a temperature below the melting point of the metal into a friable but substantially unitary charged abrasive aggregate.

11. An abrasive tool comprising a molded, highly compressed mixture of separate and distinct metal particles and abrasive grains, there being at least approximately 40% as much metal as abrasive, weakly bonded together into a friable body by a relatively small amount of a non-metallic material intimately mixed therewith and thereby forming a self-renewing charged metal lap.

12. An abrasive tool comprising a molded, highly compressed mixture of separate and distinct metal particles and abrasive grains, there being at least approximately 40% as much metal as abrasive, weakly bonded together into a friable body by a relatively small amount of a resinous material intimately mixed therewith and thereby forming a self-renewing charged metal lap.

13. An abrasive tool comprising a molded, compacted mixture of separate and distinct granular particles of a plurality of granular metals, and granular abrasive material, held in position by a brittle, non-fibrous, non-metallic bond which has been heat set to form an integral body.

14. An abrasive tool comprising a molded, highly compressed mixture of separate and distinct particles of a plurality of metals, and abrasive grains weakly bonded together by a relatively small amount of a non-metallic material intimately mixed therewith and heat set at a temperature below the melting point of the metal into a friable, but substantially unitary abrasive aggregate.

15. An abrasive tool comprising a molded, compacted mixture of separate and distinct particles of a plurality of granular metals, and granular abrasive material, there being at least approximately 40% as much total metals as abrasive, held in position by a brittle, non-fibrous, non-metallic bond which has been heat set at a temperature below the melting point of the metal into a friable, self-renewing, charged metal lap.

16. An abrasive tool comprising a molded, highly compressed mixture of separate and distinct granular metal particles and abrasive grains weakly bonded together into a friable body by a relatively small amount of a non-metallic material, said material being a plastic adherent resinous bond intimately mixed therewith and solidified in situ, said body being a self-renewing charged metal lap.

JOSEPH NEWELL BETHEL.